June 23, 1970 J. R. STALDER 3,516,686
TWIN BICYCLE CONNECTING FRAME

Filed April 24, 1968 2 Sheets-Sheet 1

John R. Stalder
INVENTOR.

BY *Clarence A. O'Brien*
and *Harvey B. Jacobson*
Attorneys

June 23, 1970  J. R. STALDER  3,516,686
TWIN BICYCLE CONNECTING FRAME
Filed April 24, 1968  2 Sheets-Sheet 2
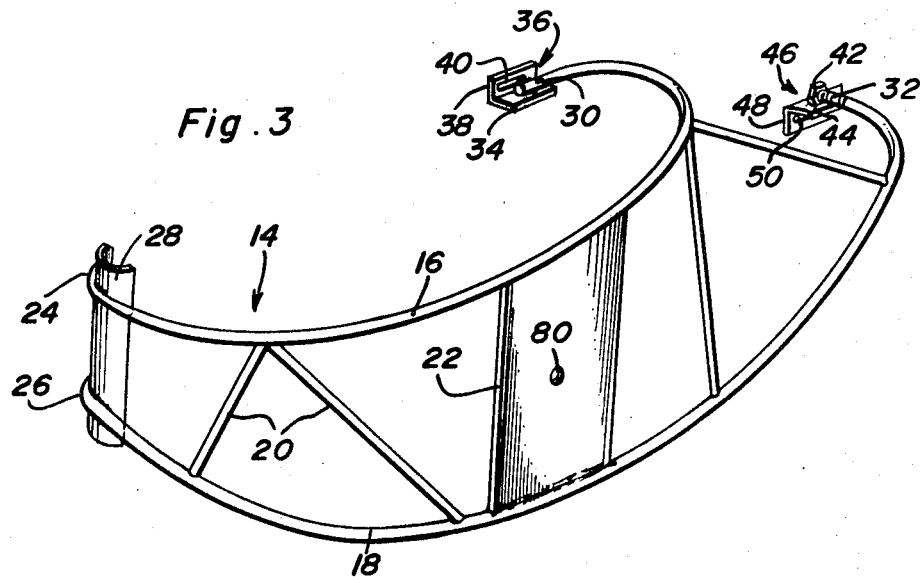
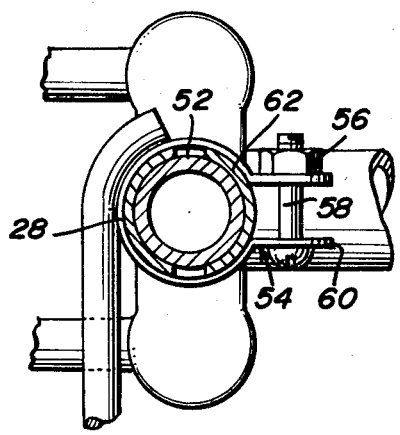
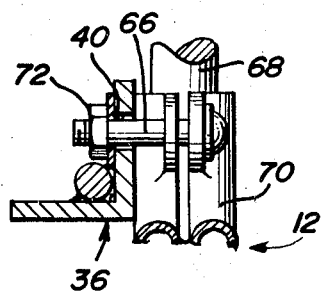
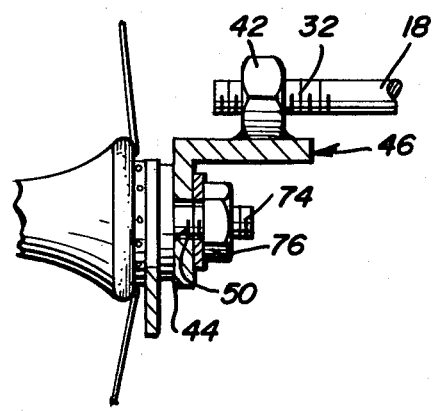
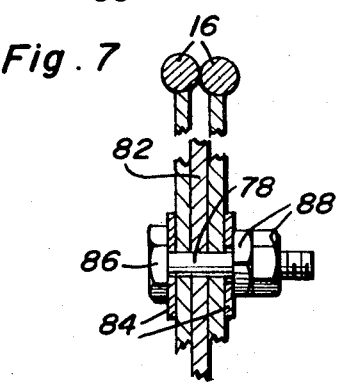
John R. Stalder
INVENTOR.

United States Patent Office 3,516,686
Patented June 23, 1970

3,516,686
TWIN BICYCLE CONNECTING FRAME
John R. Stalder, 621 S. Jackson,
Hugoton, Kans. 67957
Filed Apr. 24, 1968, Ser. No. 723,670
Int. Cl. B62k 13/06
U.S. Cl. 280—209
13 Claims

ABSTRACT OF THE DISCLOSURE

A frame for interconnecting a pair of laterally spaced bicycles which includes two pivotally interconnected frame sections. Each frame section is generally arcuate in configuration so as to, from the bicycle mounted opposite ends thereof, bulge laterally of the bicycle inwardly toward the second bicycle, and tie means interconnecting the handlebars for a tandem steering of the bicycles.

---

The instant invention is generally concerned with bicycles, and more particularly relates to a quickly connected frame for pivotally interlocking a pair of bicycles in parallel laterally spaced relation to each other for synchronized operation.

It is a primary object of the instant invention to provide a frame for pivotally interconnecting a pair of adjacent bicycles in laterally spaced parallel relation to each other for any of a variety of purposes, including a synchronized riding of both bicycles, or the riding of a single bicycle with the second bicycle acting as a stabilizing means therefor.

In conjunction with the above object, it is considered a highly significant object of the instant invention to provide a bicycle coupling or connecting frame which can be quickly and easily mounted on the two bicycles utilizing, for the most part, the various bolt and clamp means conventionally associated with a bicycle, such as for example the saddle clamp and the rear axle.

Another significant object of the instant invention resides in the provision of steering linkage means whereby a simultaneous steering of the bicycles can be effected from either handlebar.

Basically, the above objects are achieved through the provision of a connecting frame which includes two frame sections, each bowed so as to position the central portion thereof laterally outward of one side of a bicycle upon a fixed clamping of the opposed ends of the frame section to the bicycle. Each section, in addition, includes a central plate through which a pivotal connection is achieved between the frame sections so as to enable an independent pivoting of the bicycles relative to each other such as would result from unevenness in the ground surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a perspective view of one of the frame sections;

FIG. 4 is an enlarged cross-sectional detail taken substantially on a plane passing along line 4—4 in FIG. 2;

FIG. 5 is an enlarged cross-sectional detail taken substantially on a plane passing along line 5—5 in FIG. 2;

FIG. 6 is an enlarged cross-sectional detail taken substantially on a plane passing along line 6—6 in FIG. 1; and FIG. 7 is an enlarged cross-sectional detail taken substantially on a plane passing along line 7—7 in FIG. 2.

Figure 1:
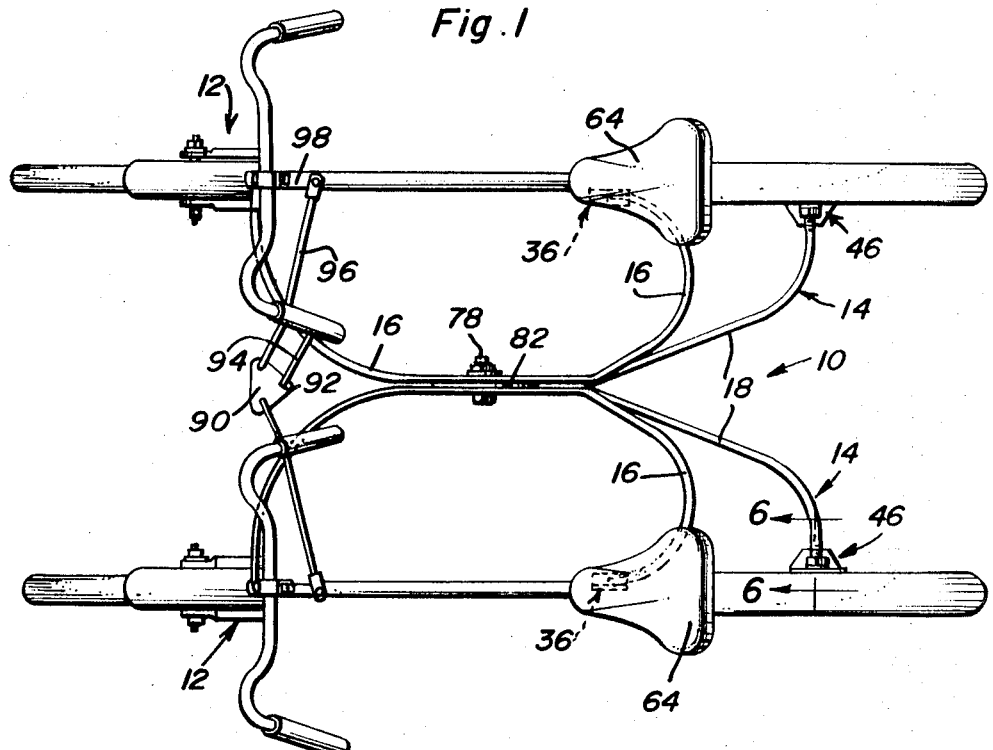
FIG. 1 is a top plan view of a pair of bicycles interconnected by the connecting frame of the instant invention.
Figure 2:
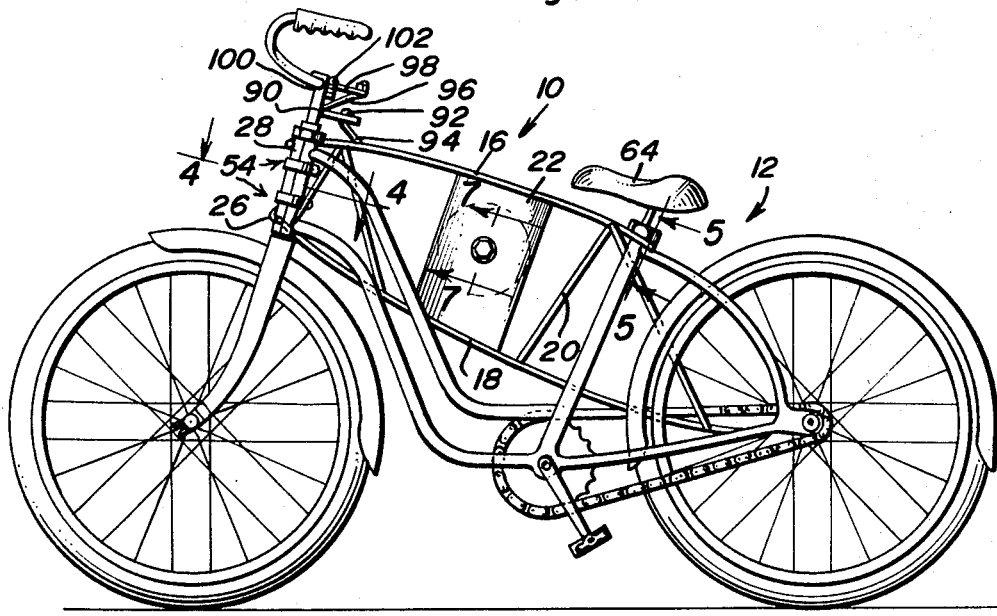
FIG. 2 is an elevational view of the bicycles and frame.

Referring now more specifically to the drawings, reference numeral 10 is used to generally designate the connecting frame of the instant invention utilized to interconnect a pair of laterally spaced bicycles 12 of conventional construction. The frame 10 itself is formed of two frame sections 14, each individually connected to one of the bicycles 12 and pivotally connected to the other frame section 14.

With reference to FIG. 3 in particular, wherein a typical frame section 14 is illustrated, it will be appreciated that the section 14 includes upper and lower rods 16 and 18 interconnected by forward and rearward pairs of diagonal braces 20 and a centrally located vertical rigid plate 22. The forward portions of the rods 16 and 18, located in vertical alignment with each other, converge slightly toward each other with the extreme forward end portions 24 and 26 being curved about and rigidly welded to a vertical arcuate plate or pipe section 28. The two rods 16 and 18, rearward from the forward ends 24 and 26 thereof, are located in vertical alignment with each other to a point rearward of the central vertical plate 22, at which point the upper rod 16 curves outwardly in an arc and terminates in a forwardly directed end portion 30 in general alignment with the forward arcuate plate 28. The lower rod 18, at the aforementioned point rearward of the vertical plate 22, also curves outwardly, however at a lesser degree, terminating in a laterally outward directed end portion 32 positioned substantially rearward of the forwardly directed end 30 of the upper rod 16. The upper rod end 30 is welded to the horizontal flange 34 of an angle bracket 36 which has the vertical flange 38 thereof projecting upwardly to the outer side of the rod end 30, this vertical flange 38 having an elongated mounting slot 40 therein. The end 32 of the lower rod 18 is externally threaded and threadedly received through a nut 42 welded to the upper horizontal flange 44 of an angle bracket 46. This angle bracket 46 also includes a depending flange 48 having an elongated mounting slot 50 therein.

Each of the sections 14 is mounted on one of the bicycles 12 as indicated in the details of FIGS. 4, 5 and 6. The arcuate plate or pipe section 28 is positioned about the forward part of the steering column 52 and rigidly clamped thereto by one or two appropriate hose-type clamps 54 which encircle the column mounted arcuate plate 28 and are each drawn tight thereabout by a nut 56 threaded on a bolt 58 extending through projecting ears 60 on each clamp 54. If so desired, a mating arcuate plate 62 can be provided about the steering column 52 in opposed relation to the arcuate plate 28 so as to provide for a firmer clamping of the steering column therein.

The upper rod bracket 36 is positioned under the bicycle saddle or seat 64 and is rigidly attached to the bicycle frame by means of the bolt 66 normally utilized in clamping the saddle shaft 68 to the tubular frame 70 of the bicycle 12. This bolt 66 will of course extend through the elongated slot 40 of the bracket 36 and receive an appropriate locking nut 72 on the threaded outer end thereof, the elongated slot 40 ensuring a proper alignment with the bolt 66. Incidentally, should it be necessary so as to accommodate the bracket 36, a bolt slightly longer than that actually provided with the bicycle can of course be utilized.

The lower rod bracket 46 aligns with and receives the threaded end of the rear wheel axle 74 through the elongated slot 50 after which the bracket 46 is firmly clamped thereto, using, in most instances, the axle nut 76. The threaded end 32 of the lower rod 18 is of significance in enabling an adjustment of the bracket 46, through the nut 42 thereon, so as to properly locate the bracket 46 for mounting, this mounting of the bracket 46 further being facilitated in an obvious manner by the elongated slot 50 through the vertical flange 44 thereof.

Finally, the two frame sections 14 are pivotally interconnected by a transverse pivot bolt 78 extending through centrally located aligned holes 80 in the vertical plates 22. An appropriate spacer 82 is provided between the two pivotally interconnected plates 22 with the pivot bolt 78 engaging the outer faces of the two plates 22 through washers 84. As will be noted, the bolt 78 has an enlarged tool receiving head 86 on one end thereof and a pair of locknuts 88 threaded on the other end thereof. With reference to FIG. 1, it will be appreciated that the central portions of the two sections 14 parallel each other at and to the opposite sides of the central plates 22.

The instant invention also contemplates the provision of means for a synchronized steering of both bicycles 12. As such, a centrally located triangular control plate 90 is pivotally mounted, at the rearwardly directed apex end thereof, to the vertically extending end portion 92 of a rigid rod 94 affixed, as by welding, at the opposite end thereof to the top rod 16 of one of the frame sections 14. The two opposed forward ends of the plate 90 are in turn pivotally connected to the vertically directed ends of a pair of outwardly extending rods 96 which in turn have the outer ends thereof pivotally engaged with the rear ends of a pair of rigid links 98 affixed to the rotatable handlebar shafts 100 through the conventionally provided handlebar clamps or bolts 102. In this manner, upon a turning of one handlebar, the associated link 98 will rotate therewith and produce, through the rods 96 and steering plate 90, a simultaneous synchronized rotation of the handlebar on the second bicycle. The pivotal engagement between the frame sections 14 allows for an independent vertical movement of one bicycle 12 relative to the other to a limited degree, thus, in order to accommodate this movement, it is contemplated that the pivot joints in the steering control system be relatively loose with the rods 96 being slightly flexible, but not to a degree to affect the steering control desired. The steering control plate 90 is also of significance in that it can be utilized to prevent an oversteering of the interconnected bicycles.

From the foregoing, it will be appreciated that a highly unique bicycle connecting frame has been defined, this frame providing for a rapid pivotal interlocking of a pair of parallel bicycles utilizing, including the steering mechanism, only four points of connection with each bicycle, three of which use clamping components which are in a conventionally constructed bicycle. The frame sections, in addition to providing for a slight pivotal movement of the bicycles relative to each other so as to accommodate irregularities in the surface over which the bicycles are traveling, also, through the elongated arcuate rod construction thereof, will inherently allow a slight flexing which will tend to have a shock-absorbing effect on the bicycles and hence cushion the ride.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed an new is as follows:

1. A connecting frame for a pair of laterally adjacent bicycles, said frame comprising a pair of adjacent and generally coextensive frame sections, means pivotally interconnecting said frame sections at the central portions thereof for pivotal movement of each section relative to the other section about an axis generally perpendicular to said sections, said sections including forward and rear ends, and mounting means on each of said section ends for mountingly engaging a bicycle so as to project laterally to one side thereof, the mounting means on the forward end of each section including a generally vertically orientated plate engageable about a portion of the steering column of a bicycle to which the frame section is to be mounted.

2. The construction of claim 1 wherein the mounting means on the rear end of each section includes a bracket having a substantially vertical flange thereon, said vertical flange having a bolt hole defined therethrough for the reception of the threaded end of an axle bolt of the rear wheel of a bicycle on which the frame section is to be mounted.

3. The construction of claim 2 wherein the mounting means on the rear of each frame section further includes a second bracket having a vertical flange thereon, said last-mentioned vertical flange having a bolt receiving hole defined therethrough for reception of the bolt utilized in clamping the saddle stem to the bicycle frame of a bicycle to which the frame section is to be mounted.

4. The construction of claim 3 wherein each frame section includes an elongated upper rod and an elongated lower rod, said arcuate plate extending between and being secured to the forward ends of both rods, said first-mentioned bracket being mounted on the rear end of the lower rod and said second-mentioned bracket being mounted on the rear end of said upper rod.

5. The construction of claim 4 wherein the means pivotally interconnecting the frame sections include a vertical plate extending between and secured to the upper and lower rods of each section, and pivot bolt means extending through said last-mentioned plates.

6. The construction of claim 5 wherein each frame section is generally arcuate, bowing outward, from the opposed ends thereof, toward the second section.

7. A connecting frame for a pair of laterally adjacent bicycles, said frame comprising a pair of adjacent and generally coextensive frame sections, means pivotally interconnecting said frame sections at the central portions thereof for pivotal movement of each section relative to the other section about an axis generally perpendicular to said sections, said sections including forward and rear ends, and mounting means on each of said section ends for mountingly engaging a bicycle so as to project laterally to one side thereof, the mounting means on the rear end of each section including a bracket having a substantially vertical flange thereon, said vertical flange having a bolt hole defined therethrough for the reception of the threaded end of an axle bolt of the rear wheel of a bicycle on which the frame section is to be mounted, said bracket including an internally threaded nut fixed thereto, the rear end of said frame section including an externally threaded portion thereon threadedly receiving said nut for an adjustmet of said bracket on said end.

8. The construction of claim 7 wherein the mounting means on the rear of each frame section further includes a second bracket having a vertical flange thereon, said last-mentioned vertical flange having a bolt receiving hole defined therethrough for reception of the bolt utilized in clamping the saddle stem to the bicycle frame of a bicycle to which the frame section is to be mounted.

9. A connecting frame for a pair of laterally adjacent bicycles, said frame comprising a pair of adjacent and generally coextensive frame sections, means pivotally interconnecting said frame sections at the central portions thereof for pivotal movement of each section relative to the other section about an axis generally perpendicular to said sections, said sections including forward and rear ends, and mounting means on each of said section ends for mountingly engaging a bicycle so as to project laterally to one side thereof, each of said frame sections including an elongated upper rod and an elongated lower rod, said mounting means comprising a generally vertical arcuate plate extending between and rigidly affixed to the forward ends of said upper and lower rods, and a separate mounting bracket affixed to the rear end of each of said upper and lower rods, each of said brackets including a bolt receiving hole therethrough for bolted engagement with an adjacent bicycle.

10. The construction of claim 9 wherein each of said rods is generally arcuate in configuration, the rear end portion of the upper rod extending through an arc of 180° and terminating in a forwardly directed rear end portion, the lower rod having the rear end portion thereof terminating in an end directed approximately 90° to the length of the frame section.

11. In combination, laterally spaced generally parallel bicycles, a connecting frame positioned between and interconnecting said bicycles, said frame including a pair of frame sections, each connected with one of said bicycles, pivotally interconnectd between said bicycles for rotational movement relative to each other about an axis perpendicular to said bicycles, each of said bicycles including a clamping bolt utilized in fixing the elevation of the saddle, a bracket on the rear end of each frame section, said clamping bolt clampingly engaging said bracket to said bicycle, each bicycle further including a threaded rear axle bolt, each of said frame sections including a bracket received on the rear axle bolt of the associated bicycle, and means for locking this second bracket on the rear axle bolt, each of said bicycles also including a forwardly located steering column, each of said frame sections including an arcuate member received about a portion of the steering column of the associated bicycle, and means clamping the arcuate member to the steering column, the central portion of each of said frame sections extending laterally from the side of the associated bicycle toward the second bicycle.

12. The construction of claim 11 including a front wheel steering shaft on each bicycle and means interconnecting said steering shafts for a coordinated movement thereof.

13. The construction of claim 12 wherein said means interconnecting said steering shafts comprise a steering control plate pivotally mounted substantially horizontally between said bicycles, and link means engaged between each steering shaft and said control plate for effecting a pivotal movement of said control plate in response to a rotation of the corresponding steering shaft, said link means being engaged with said control plate in spaced relation to each other and to the point of pivotal mounting of the control plate.

References Cited
UNITED STATES PATENTS

| | | | |
|---|---|---|---|
| 565,443 | 8/1896 | Eells | 280—209 |
| 639,943 | 12/1899 | Schleicher | 280—209 |
| 1,522,039 | 1/1925 | Swearinger | 280—209 |

KENNETH H. BETTS, Primary Examiner